United States Patent
Schindler

(10) Patent No.: US 7,849,333 B2
(45) Date of Patent: Dec. 7, 2010

(54) INLINE POWER ALLOCATION FOR POWER OVER ETHERNET APPLICATIONS

(75) Inventor: Frederick Roland Schindler, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1244 days.

(21) Appl. No.: 11/429,906

(22) Filed: May 8, 2006

(65) Prior Publication Data

US 2007/0257780 A1 Nov. 8, 2007

(51) Int. Cl.
G06F 1/28 (2006.01)
(52) U.S. Cl. .................................... 713/300
(58) Field of Classification Search ............... 713/300
See application file for complete search history.

(56) References Cited

U.S. PATENT DOCUMENTS

| | | | | |
|---|---|---|---|---|
| 5,018,148 A * | 5/1991 | Patel et al. ...................... 714/22 |
| 5,291,528 A * | 3/1994 | Vermeer ...................... 375/354 |
| 5,748,972 A * | 5/1998 | Clark et al. .................. 713/323 |
| 6,487,670 B1 * | 11/2002 | Racino et al. ................ 713/340 |
| 6,628,207 B1 * | 9/2003 | Hemminger et al. ... 340/870.02 |
| 7,240,224 B1 * | 7/2007 | Biederman .................. 713/300 |
| 7,392,407 B2 * | 6/2008 | Jonnala et al. .............. 713/300 |
| 7,433,763 B2 * | 10/2008 | Culley ........................ 700/295 |
| 2005/0262364 A1 | 11/2005 | Diab et al. |
| 2006/0092000 A1 | 5/2006 | Karam et al. |

OTHER PUBLICATIONS

IEEE Std 802.3af-2003, "Standard for Information Technology, Part 3: CSMA/CD Access Method and Physical Layer Specifications, Amendment: DTE Power via MDI".

* cited by examiner

Primary Examiner—Thomas Lee
Assistant Examiner—Eric Chang
(74) Attorney, Agent, or Firm—Cindy Kaplan

(57) ABSTRACT

A method and system for requesting inline power at a powered device coupled to power sourcing equipment in a communications network are disclosed. The method includes drawing power corresponding to a requested power level at the powered device, operating the powered device in a first mode if the requested power level is maintained at the powered device, and operating the powered device in a second mode if power to the powered device is removed and is restored within a predetermined time.

23 Claims, 8 Drawing Sheets

INLINE POWER ALLOCATION FOR POWER OVER ETHERNET APPLICATIONS

BACKGROUND OF THE INVENTION

The present invention relates generally to inline power, and more particularly to a method and system for inline power allocation in applications such as Power over Ethernet (PoE).

Inline power (also known as power over Ethernet) is a technology for providing electrical power over a wired telecommunications network from power sourcing equipment (PSE) to a powered device (PD) over a link section. The power may be injected by an endpoint PSE at one end of the link section or by a midspan PSE along a midspan of a link section that is distinctly separate from and between the media dependent interfaces (MDI) to which the ends of the link section are electrically and physically coupled.

PoE is defined in the IEEE (Institute of Electrical and Electronics Engineers, Inc.) Standard 802.3af—2003, published Jun. 18, 2003 and entitled "IEEE Standard for Information technology—Telecommunications and information exchange between systems—Local and metropolitan area networks—Specific requirements, Part 3: Carrier Sense Multiple Access with Collision Detection (CSMA/CD) Access Method and Physical Layer Specifications, Amendment: Data Terminal Equipment (DTE) Power via Media Dependent Interface (MDI)", which is incorporated herein by reference. The IEEE 802.3af standard combines the transmission and reception of Ethernet packets with the transmission and reception of DC-based power over the same set of wires in a single Ethernet cable.

In accordance with the 802.3af standard, a PSE carries out an inline power detection process, and if successful, an inline power classification process. The detection process is performed to detect the presence of a PD at a network port prior to sending power to it and to prevent sending power and causing damage to devices that are non-compliant with the PoE standard. The classification process set forth in 802.3af, involves applying a voltage in a classification range to the PD. The PD may use a current source to send a predetermined classification current signal back to the PSE. This classification current signal corresponds to the class of the PD. Under the current 802.3af standard, the PD is classified as a member of one of a set of five classes shown below in Table I. While the 802.3af standard delivers different wattages, powered devices are often allocated more power than they need.

TABLE I

| Class | PSE Classification Current Range (mA) | Corresponding Inline Power Level (W) | Usage |
|---|---|---|---|
| 0 | 0–5 | 15.4 | default |
| 1 | 8–13 | 4.0 | optional |
| 2 | 16–21 | 7.0 | optional |
| 3 | 25–31 | 15.4 | optional |
| 4 | 35–45 | 15.4 | reserved for future use |

In accordance with the 802.3af standard, power is provided up to about 15.4 watts. This may be enough power for a wide array of small devices, however, most laptops, personal computers, and other commonly networked devices require more power. The IEEE is therefore currently working to enhance the 802.3af standard to give networked devices more power. The new standard, IEEE 802.3 at (PoE Plus), is expected to extend the 802.3af standard power delivery capability to provide increased power to PDs (e.g., 30 or more watts).

It is therefore desirable to provide additional capability to allocate power to PDs and provide more power than is currently contemplated under the IEEE 802.3af standard, as well as additional and more precise power gradations.

SUMMARY OF THE INVENTION

A method and system for requesting inline power at a powered device coupled to power sourcing equipment in a communications network are disclosed. The method includes drawing power corresponding to a requested power level at the powered device, operating in a first mode if the requested power level is maintained at the powered device, and operating in a second mode if power to the powered device is removed and power is subsequently received at the powered device within a predetermined time.

In another aspect of the invention, a method for allocating inline power at power sourcing equipment to a powered device coupled to the power sourcing equipment in a communications network generally comprises detecting the powered device at the power sourcing equipment and receiving a request for power at a first power level from the powered device. If power is available at the power sourcing equipment at the first requested power level, it is provided to the powered device. If power at the first requested power level exceeds available power at the power sourcing equipment, power provided by the power sourcing equipment is removed and a request for power at a second power level is received from the powered device. The power sourcing equipment then provides power to the powered device at the second requested power level.

In yet another aspect of the invention, a powered device is adapted to operate in conjunction with coupled power sourcing equipment so that it can receive inline power from the power sourcing equipment. The powered device generally comprises a controller operable to present a requested power level at the powered device, select a first operating mode if said requested power level is maintained and select a second operating mode if power to the powered device is removed and is restored within a predetermined time period.

Further understanding of the nature and advantages of the inventions herein may be realized by reference to the remaining portions of the specification and the attached drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1A:
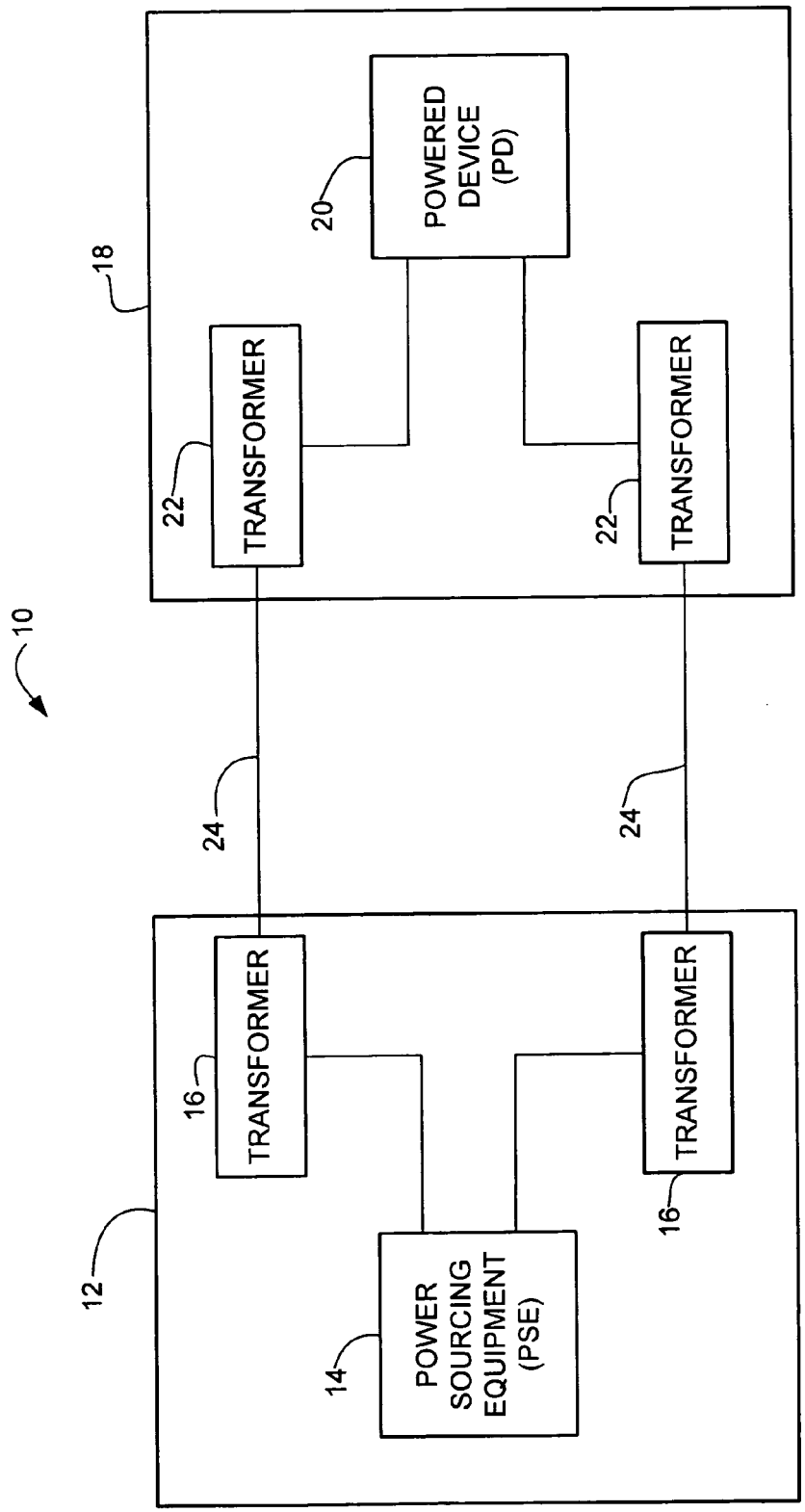
FIG. 1A illustrates an exemplary powered network connection that may be utilized to implement an embodiment of the present invention.
Figure 1B:
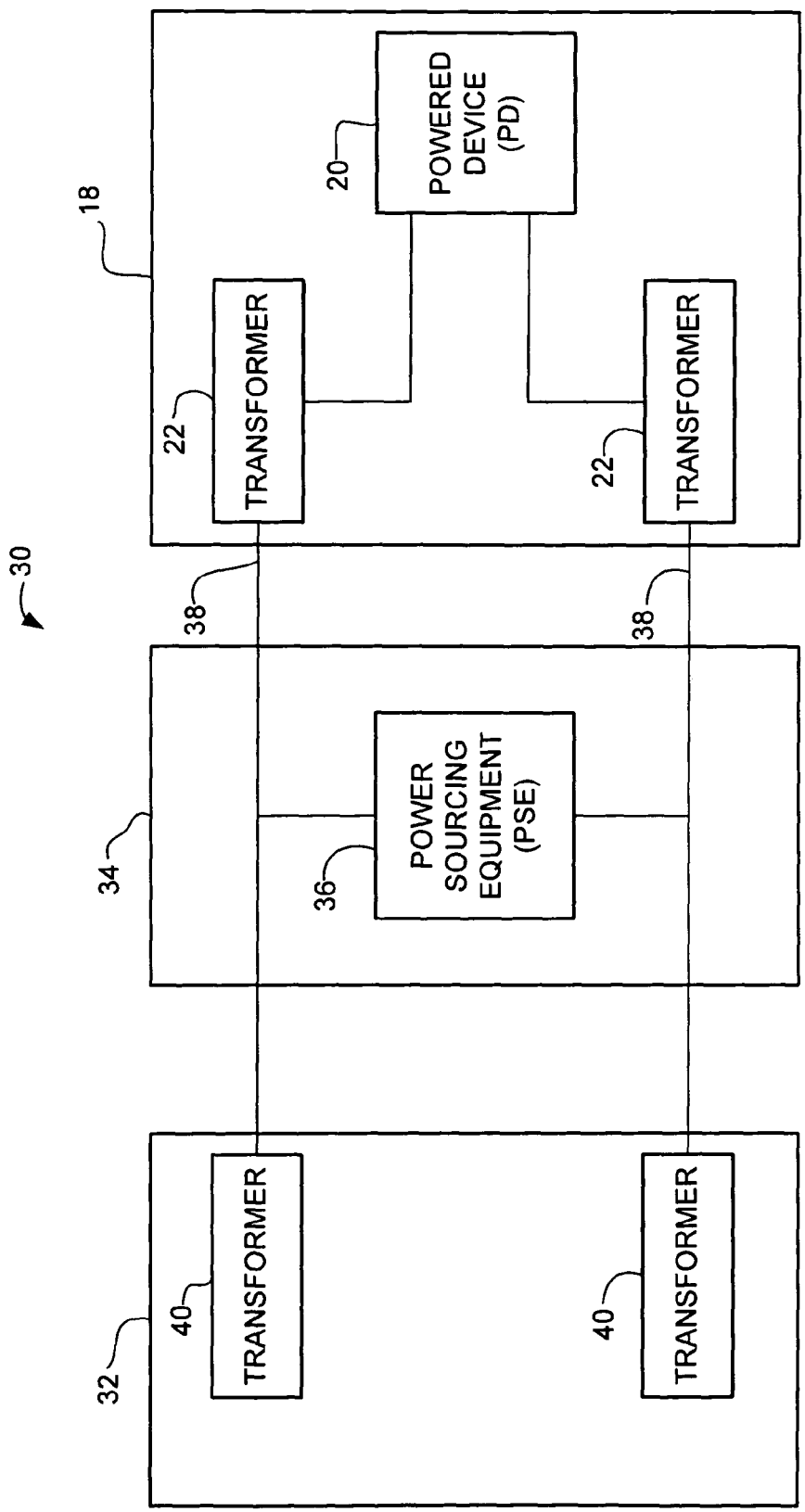
FIG. 1B illustrates another exemplary powered network connection that may be utilized to implement an embodiment of the present invention.
Figure 6:
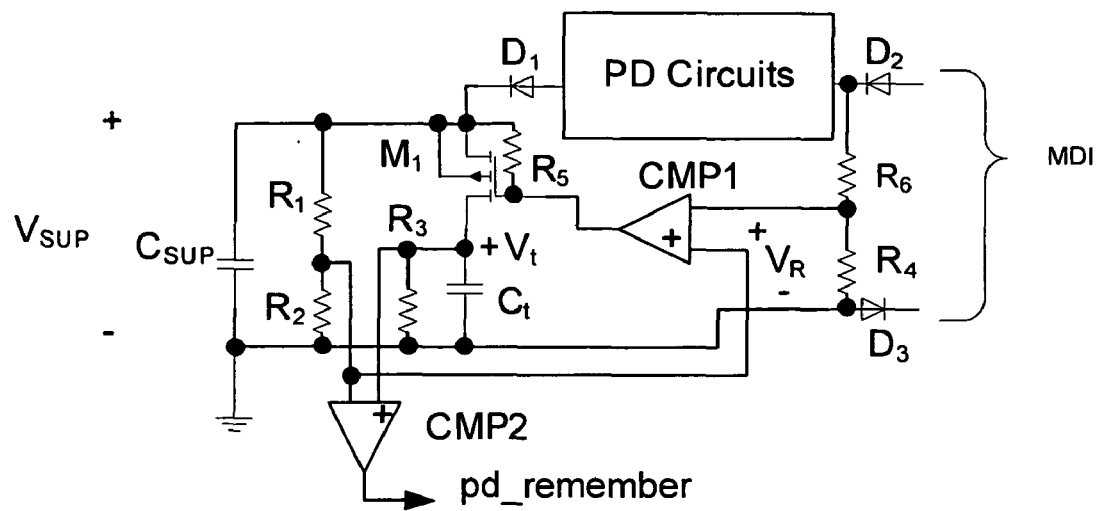
FIG. 6 is a circuit diagram illustrating one embodiment of a memory timer of the powered device.
Figure 8:
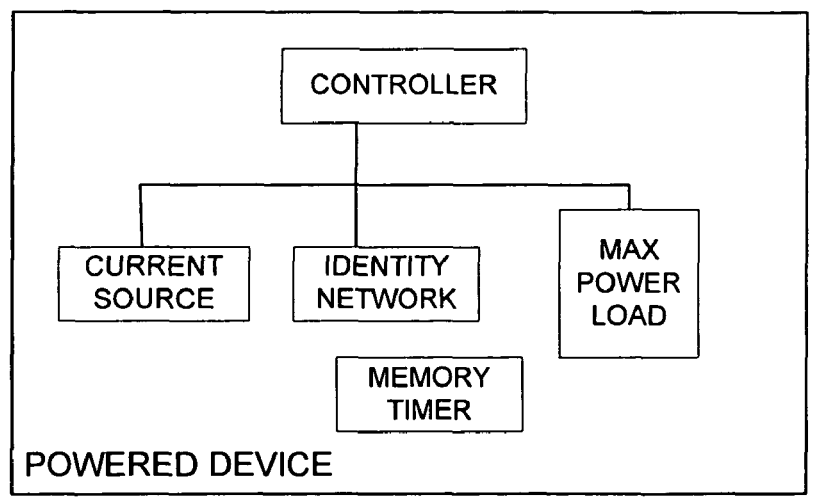
FIG. 8 is a block diagram illustrating exemplary components of the powered device.

Referring now to the drawings, and first to FIGS. 1A and 1B, power delivery systems for delivering power to one or more powered devices over Ethernet cables are shown. In FIG. 1A a data telecommunications network 10 includes a network device 12 comprising integral power sourcing equipment (PSE) 14 (endpoint PSE) and transformers 16, and a powered end station 18 comprising powered device 20 and transformers 22. The network device 12 may be a switch, hub, router, or other network equipment. The powered device 20 may be a telephone, personal computer, personal digital assistant, laptop, wireless network access point, docking station, surveillance camera, various types of sensors and data acquisition equipment, or any other device that may be powered over Ethernet lines. The powered device 20 requests or draws power from the PSE 14 through Ethernet cables 24. Power from PSE 14 is injected on the cables 24 via transformers 16. Details of the PD 20 are shown in FIGS. 6 and 8 and described below.

In FIG. 1B a data telecommunications network 30 includes a network device 32 without integral power sourcing equipment, midspan power insertion equipment (MPIE) 34, and powered end station 18 comprising powered device 20 and transformers 22. Similar to network device 12 in FIG. 1A, the network device may be a switch, hub, router, or other network equipment involved in the data transmission path, and includes transformers 40. MPIE 34 includes PSE 36 (midspan PSE) to provide power to powered device 20. The PD 20 requests or draws power from PSE 36 through network cables 38. The MPIE passes data therethrough and provides power on the cable pairs not used for signals (in the case of 10/100 Mbps Ethernet) and therefore does not require a coupling transformer. A 10/100/1000 system typically uses all wires within the cable for signal transmission and the MPIE couples into a signal pair using a transformer.

It is to be understood that the communications networks shown in FIGS. 1A and 1B are provided as examples and the network on which the present invention is implemented may be different than shown without departing from the scope of the invention. For example, the network device 12, 32 or midspan power insertion equipment 34 may include one or more PSEs 14, 36 to provide power to one or more PDs 20.

In an exemplary embodiment, the PSE and PD function in accordance with the requirements of the IEEE 802.3af standard to perform a discovery and classification process. The detection process is carried out periodically over a port to see if an IEEE 802.3af PD is coupled thereto so that inline power may be applied. If an appropriate PD is detected, a classification process is carried out. As described in detail below, the powered device is classified to identify the device as a PD requesting a power level outside of the IEEE 802.3af standard classification. This new inline power allocation (referred to herein as "classification extension" or "extended power level") may provide higher or lower power levels than provided by the existing IEEE 802.3af power levels, or may provide power within the range of the current 802.3af power level classifications, but at more narrowly defined classes. In one embodiment, the powered device may be a high power-powered device that requires more than 12.95 watts, which is the current maximum power typically consumed by conventional low power-powered devices. In the case where the PD is underpowered by the PSE, a method is provided to allow the PD to operate in a manner that corresponds to a lower or reduced function power level (e.g., IEEE 802.3af power level classes). The PD may therefore operate at two (or more) modes; a first (high power) mode or a second (low power) mode, depending on the capabilities of the power sourcing equipment. The present invention thus leverages the current standard and provides additional capability without making prior equipment obsolete.

Figure 2:
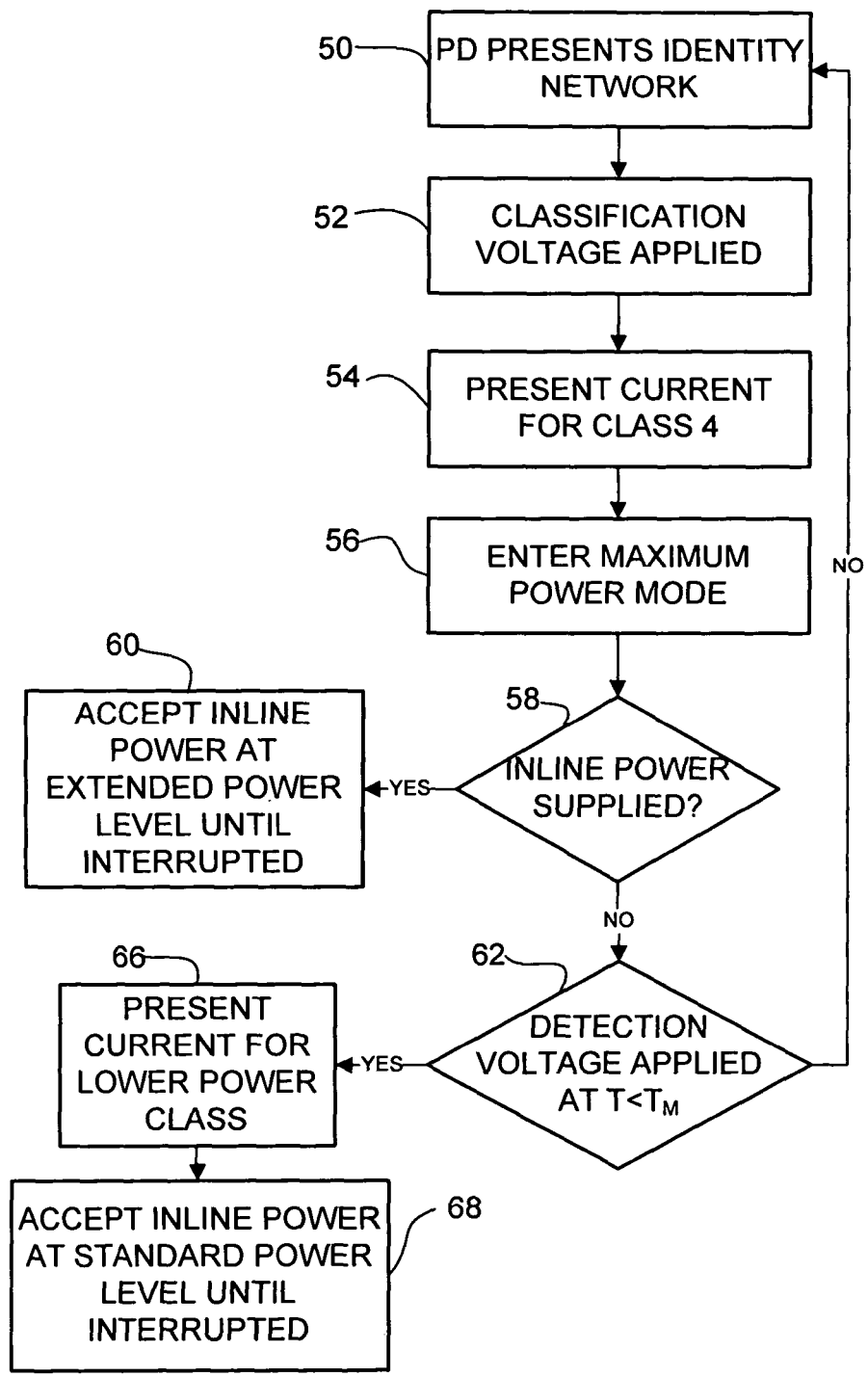
FIG. 2 is a flowchart illustrating a method for inline power allocation for a powered device according to one embodiment of the present invention.
Figure 3:
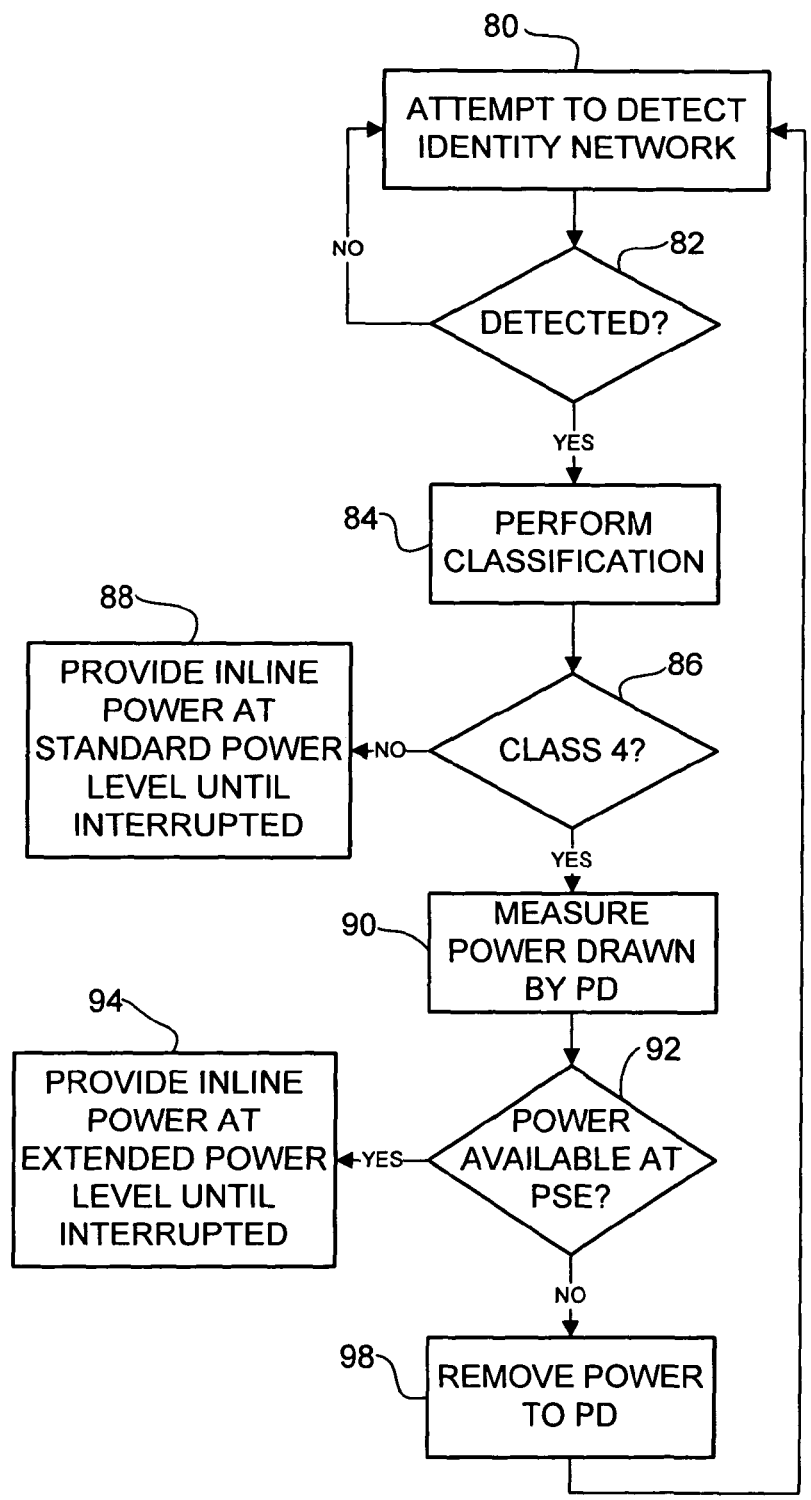
FIG. 3 is a flowchart illustrating a method for inline power allocation from power sourcing equipment according to one embodiment of the present invention.

A method in accordance with one embodiment of the present invention is shown in the process flowcharts of FIGS. 2 and 3. Referring first to FIG. 2, a process flow diagram illustrating the process flow from the PD side of the connection is shown. As discussed in detail below, the PD uses a timer (memory timer) to remember if it was recently powered on. At the start of the process set forth in FIG. 2, it is assumed that the PD has been powered off for a sufficient amount of time such that it does not remember being powered on. At step 50, the PD presents its identity network across the conductors of the wired data telecommunications network. The identity network is one or more electrical components which respond in certain predetermined ways when probed by a signal from the PSE. The IEEE 802.3af standard permits a 25,000 ohm resistor to be presented for discovery by the PD because it is within the permissible range of values (other values may also be used). The resistor may be present at all times or it may be switched into the circuit during the discovery process in response to detection by the PD of discovery signals from the PSE.

After the voltage applied by the PSE rises to carry out the detection of the identity network, it drops into an idle range, and then rises into a classification range (step 52). Step 52 is a condition that permits the process flow to continue to step 54. When the applied voltage from the PSE reaches the classification range, the PD draws its classification current on the wired data telecommunication network cable. In accordance with one embodiment of the present invention, the PD presents current indicating a class 4 power requirement (according to the IEEE 802.3af standard classification shown above in Table I) (step 54). Class 4 of the 802.3af standard is a reserved class which uses a current range of 35-45 mA. This is used to show that extended power demands are required using already specified power requirements to the PSE (12.95 watts). It is to be understood that utilization of class 4 to indicate use of the extended classification described herein, is only one example, and that other indications may be used.

At step 56 the PD enters a maximum power mode and reports its peak power demand to the PSE. While in its maximum power mode, the PD may draw its maximum power requirement or a percentage thereof from the PSE. For example, the PD may operate at a percentage of its maximum power requirement to report a reference power level that is a factor of its peak power demand. The power requirement reported by the PD may also be an increased power demand to provide a safety margin to ensure that the power requirements of the PD are met under current operating conditions and possible changes over time. In order to provide an indication of its peak power demand, the PD may go through a cycle in which it turns on all or a portion of its power consuming devices (e.g., lights, system checks, etc.).

Since the PSE has a finite amount of inline power resource available for allocation to coupled PDs, it needs to be determined if the PSE has sufficient capacity to meet the power requirements of the new PD (step 58). If the PSE has sufficient power available, control transfers to step 60 wherein the inline power level requested is provided to power the PD. The PD continues to operate in its first (high power) mode until power is interrupted.

If the PSE does not have sufficient capacity to provide the requested power to the PD, the PSE removes power to the PD (e.g., reduces power below a predetermined threshold). If the voltage supplied to the PD drops below a threshold level, the memory timer (described below) will start at the PD. The timer measures how long the PD has been powered off. If the detection voltage is presented to the PD before the timer has reached its limit (Time $(T)<\text{Time}_{memory}(T_m)$), the PD remembers that it was previously powered on and will request a lower or standard power setting (step 62). In accordance with one embodiment of the present invention, the PD assumes that a legacy PSE (e.g., PSE that is only capable of providing 802.3af power levels) has restored power and the PD needs to report a standard power class level (step 66). The lower power level is provided to power the PD until interrupted (step 68). The PD may provide an indication that it is operating in a reduced power mode. For example, the PD may display an alert to a user or reduce the number of functions that can operate simultaneously, while operating in this second (low power) mode.

In another embodiment, steps 58-68 are repeated one or more times to provide additional operating modes. For example, the process may be carried out as shown in steps 50-68 with the PD presenting current corresponding to class 2 (IEEE 802.3af) at step 66. The PSE provides 7 watts of power corresponding to class 2 (second operating mode of PD). The power is subsequently removed again and the PD presents a current corresponding to class 1. The PSE now provides 4 watts of power to the PD (third operating mode of PD). The PD includes another level of memory so that it remembers that the power was applied and removed twice.

FIG. 3 is a process flow diagram illustrating the process flow from the PSE side of the connection. At step 80 the PSE attempts to discover the PD by carrying out a detection process aimed at verifying the presence of an appropriate identify network disposed across the conductors of the wired data telecommunications network. The PSE applies a discovery signal to measure resistance and determine if the identity network is present.

If no identity network is found (step 82), control reverts back to step 80 to continue the detection process from time to time until an identity network is found. If an identity network is found, control passes to step 84 where the classification process starts.

The classification process involves applying a voltage in a classification range to the PD. The PD may use a current source to send a predetermined classification current signal back to the PSE. The classification current signal corresponds to the class of the PD. Each measured current corresponds to a class, such as the IEEE 802.3af classes described above, or other classes defined in a non-IEEE 802.3af standard system. These classes are determined by correlating the measured current with a class value or other representation.

As discussed above, one embodiment of the present invention utilizes class 4 of the IEEE 802.3af standard to identify the PD as a device requesting extended power levels. If a standard 802.3af class other than class 4 is presented (e.g., class 1, 2, or 3), the PSE provides corresponding inline power to the PD until interrupted (steps 86 and 88). The PSE may operate from this point, for example, according to the method set forth in IEEE 802.3af.

If the PD indicates class 4, the PSE waits to receive an indication from the PD of its maximum power and measures the power drawn by the PD (steps 86 and 90). A timer may be used to allow time for the system to stabilize before the peak power demand is measured. As noted above, the PD may incorporate a safety margin into the peak power demand reported to the PSE. In a preferred embodiment, the PSE provides the safety margin and incorporates it into the power requirement reported by the PD. The peak power demand may be reported to the PSE as a maximum power level or a percentage of maximum power requirements.

In a preferred embodiment, the peak power demand is reported to the PSE as a percentage of maximum power requirements (e.g., $K_{power}$ value). The $K_{power}$ value is preferably set so that the current consumed by the PD falls within an $I_{MIN1}$ threshold as defined in IEEE 802.3af. In this case, a legacy PSE will identify a class 4 classification for the new PD and power it on if the PSE has sufficient power. The PSE will not see enough current to remain connected if it is using a DC-disconnect mechanism or it will remain connected if using an AC-disconnect mechanism and remove power if the PSE moves to a power level it can support.

If the full peak demand is provided by the PD, the power level measured at the PSE includes line losses over the network cables and therefore provides an accurate indication of power requirements. If a peak power value (e.g., % of peak power demand) is provided by the PD, a method such as disclosed in U.S. Patent Application Publication No. US 2005/0262364, entitled "Method and Apparatus for Provisioning Phantom Power to Remote Devices", which is incorporated herein by reference in its entirety, may be used to establish channel loss.

If the PSE has sufficient capacity to meet the power requirements of the PD, the PSE allocates power to the PD and provides corresponding inline power to the PD until interrupted (steps 92 and 94). The PSE may record the peak demand for its power accounting purposes. The PSE may use the recorded peak demand to check (police) power levels during operation to ensure the system is operating normally.

If the PSE does not have sufficient capacity to provide the requested power, the PSE removes power from the PD (e.g., drops power below a threshold level) (step 98). The process returns to step 80 and the PSE detects the PD during its next detection cycle and performs the classification process (steps 82 and 84). If power is restored before the PD memory timer reaches its limit, the PD remembers that it was previously powered on and assumes that a legacy PSE has restored power. The PD then requests a lower power setting by reporting, for example, a standard 802.3af power level class during the classification process (steps 86 and 88).

It is to be understood that the process shown in FIGS. 2 and 3 is just one example and that steps may be added or removed without departing from the scope of the invention. Also, details of the portions of the process performed in accordance in conventional inline power allocation methods (which are well known by those skilled in the art) are not shown. Additional details of the inline allocation process are set forth below with respect to the state diagrams of FIGS. 4 and 5.

Figure 4:
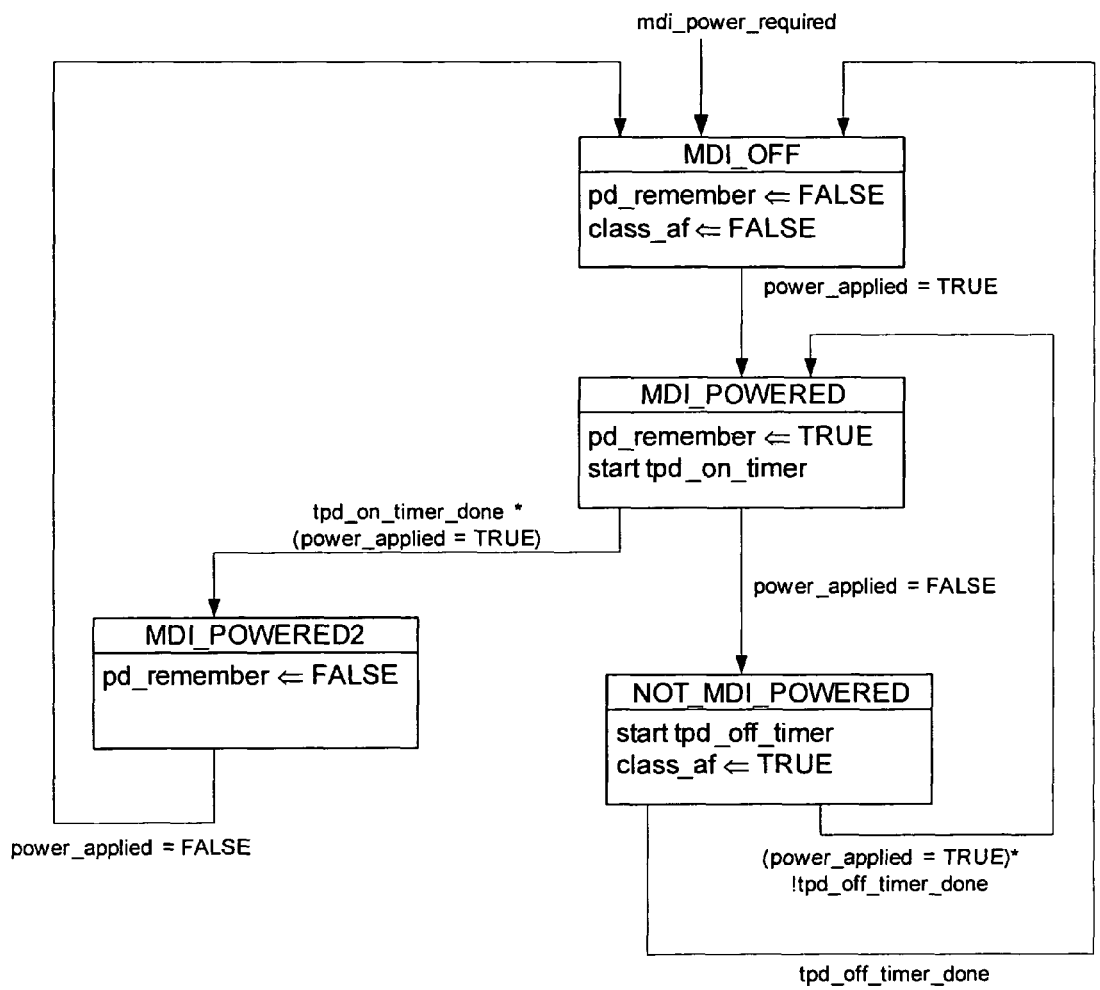
FIG. 4 is a state diagram for the powered device.
Figure 5:
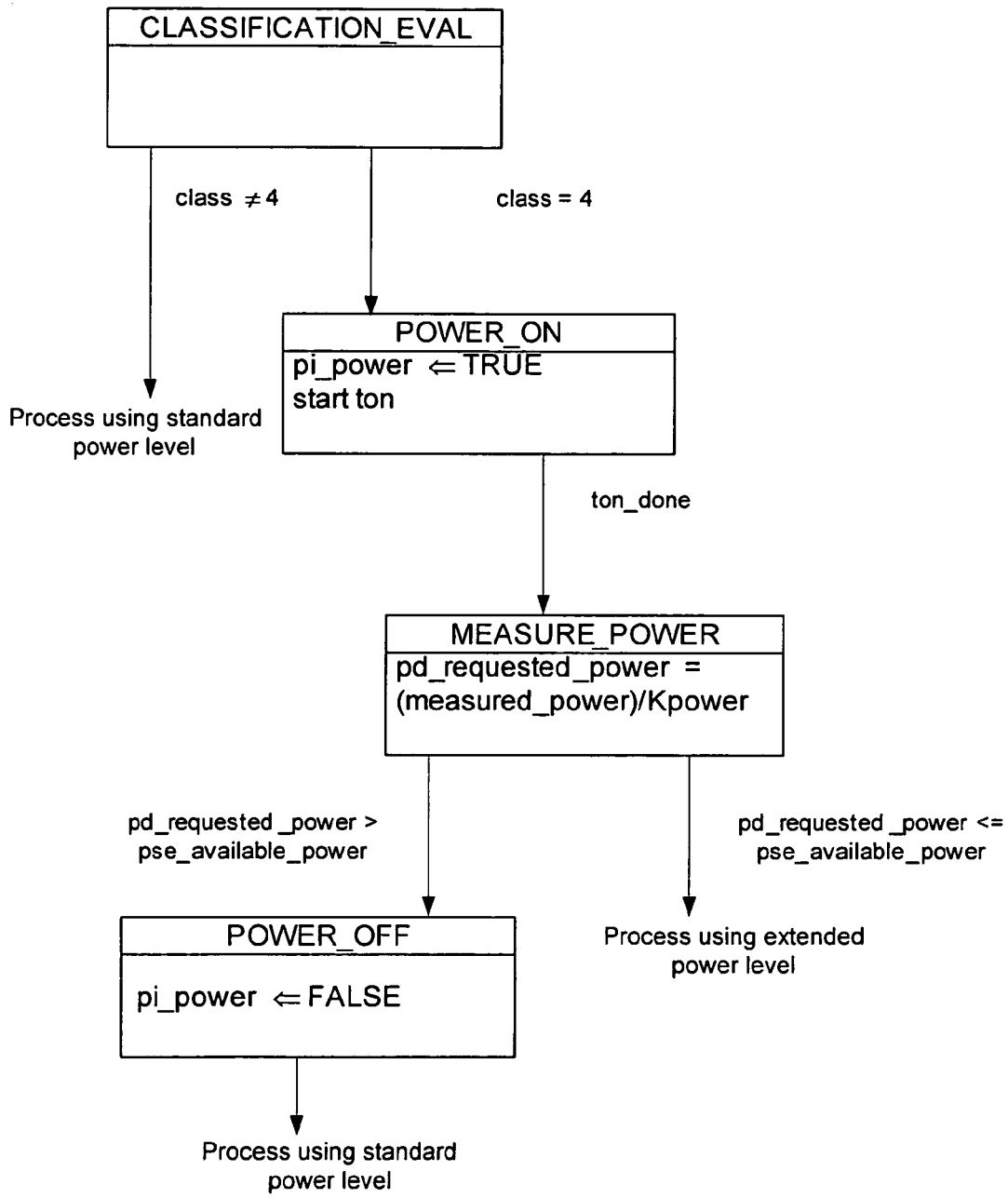
FIG. 5 is a state diagram for the power sourcing equipment.

FIGS. 4 and 5 illustrate state diagrams for the PD and PSE, respectively. It is to be understood that not all corner cases as currently covered by IEEE 802.3af (and well known by those skilled in the art) are shown in the state diagrams and some of the states are simplified to reduce complexity.

Referring now to FIG. 4, four states of the PD are shown; MDI_OFF, MDI_POWERED, MDI_POWERED2, and NOT_MDI_POWERED. The class reported to the PSE is determined by the PD state machine. The state machine determines whether the PSE can support the classification extension or standard class levels need to be used.

The PD is visible to the PSE when it moves into state MDI_OFF. In this state it resets its memory of a previous power-on (pd_remember=false) and prepares to report its power demand using the classification extension described herein (class_af=false). When the PSE applies power (power_applied=TRUE), state MDI_POWERED is entered, the PD remembers that it was powered on (pd_remember=TRUE) and tpd_on_timer is started. The timer measures the PD power-on time. If power remains on (power_applied=TRUE) and the timer reaches a preset limit, tpd_on_timer_done is asserted and state MDI-POWERED2 is entered. In this state the PD forgets it has been powered on (pd_remember=FALSE). The PD has been powered on long enough that it is known that the PSE has allocated power to support the PD. Therefore, if the PD power is removed (power_applied=FALSE) in state MDI_POWERED2, the PD shall use the classification extension to report its power needs to the PSE.

When class_af is FALSE, the PD may enter a power mode that is within or above the current IEEE 802.3af power range (extended power level class). When the variable class_af is TRUE, the PD can only report standard (or low power) classes (e.g., IEEE 802.3af power class levels). The variable tpd_on_timer_done is asserted when the PD has been powered for a period of time that ensures that the PD has had time to reach its maximum power level and that the PSE has had sufficient time (e.g., about 2 seconds) to measure the power levels.

If power is removed (power_applied=FALSE) before tpd_on_timer_done is asserted, state NOT_MDI_POWERED is entered. In this state, timer tpd_off_timer (memory timer) is started. This timer measures how long the PD has been powered off. Variable tpd_off_timer_done is asserted when the PD off timer reaches a preset level that ensures most PSEs have had sufficient time to keep power off in order to meet the IEEE 802.3af $T_{ed}$ time (error delay time because excessive current was drawn by the PD). When tpd_off_timer_done is asserted, the PD forgets it was powered because a PSE that can support this classification extension may be available.

If power is restored (power_applied=TRUE) before tpd_on_timer_done is asserted (!tpd_off_timer_done), then the PD assumes that a legacy PSE has restored power. Therefore, the PD needs to report existing classes (e.g., IEEE 802.3af standard classes) using conventional methods. The PD operates in a mode that fits within the legacy power range.

FIG. 5 illustrates four states of the PSE; CLASSIFICATION_EVAL, POWER_ON, MEASURE_POWER, and POWER_OFF. The power class is determined, as previously described, in state CLASSIFICATION_EVAL. If the class level measured indicates a conventional class (class≠4), the power is applied using standard class power levels (e.g., IEEE 802.3af power classes). If the class measured shows that extended class levels are required (class=4), state POWER_ON is entered, power is applied (pi_power=TRUE) and a ton timer is started. The ton timer ensures that the power is only measured in state MEASURE_POWER when the system has had time to stabilize (ton_done). During this time a new PD creates a reference power level that is Kpower (a constant) of its peak power demand (pd_requested_power= (measured_power)/Kpower). The PD creates the peak power within this interval and then moves to a power level within the specified range. The peak power is captured during a specific interval by the PSE. The PD may not always be at its peak value during the interval in which it should produce peak power. Since the PSE is aware of this, it will capture the peak power using a predefined method. In one embodiment, the PSE will capture power averaged over a 1 msec period.

The MEASURE_POWER state transitions to the POWER_OFF state if the PD demand exceeds the PSE power budget (pd_requested power>pse_available_power). Power is provided using standard class levels (e.g., IEEE 802.3af). The PSE may operate at this point, for example, using the methods set forth in IEEE 802.3af. Otherwise, power is accounted for and the PSE continues to power the PD (pd_requested_power≦pse_available_power). Existing thresholds for current limits are scaled to accommodate the new classification extension while ensuring safe operation of the system.

The PSE preferably uses the class value produced after its most recent detection. This is to prevent the PSE from operating in a loop where it does detection and classification, and then repeats this until the system CPU checks the port controller doing this loop. The CPU preferably uses the class tied to the latest detection because the stale value may be for an IEEE 802.3af class, but the new class value may be a class 4 because the tpd_off_timer_expired.

The PSE preferably waits more than two seconds if it denied power to the PD and then subsequently has a power budget to provide all the PD power requirements. This test ensures that a new PD is classified using the new methods because the new PD has been powered off long enough that it has forgotten it was recently powered on.

The following describes different methods and devices for use by the PD in remembering its operating state. In one embodiment, the PD includes a memory circuit operable to temporarily store an indication that power was previously applied at the apparatus and a timer circuit operable to remove the indication from the memory circuit after a predetermined time period. The circuits can be powered from a storage capacitor ($C_{SUP}$ described below with respect to FIG. 6), or battery that is charged from power derived from the PD MDI (media dependent interface). The temporary power storage is configured to store sufficient power to operate the state machine circuits for more than the tpd_off_timer_done threshold. The charge derived from the MDI is absorbed at acceptable legacy power levels during the time provided for the PD to reach its reference power level. The power storage element is isolated from the main PD power source by a diode ($D_1$, shown in FIG. 6). This ensures that the power storage element is charged from the main PD power source but isolated from this source when the source is lower in voltage than the power storage element.

FIG. 6 illustrates an RC-timer that may be used for the memory timer in one embodiment of the present invention. Resistors $R_4$ and $R_6$ scale the PD MDI voltage. Comparator CMP1 compares this scale voltage to voltage $V_R$. When the value of the MDI is within the power-on range, CMP1 pulls the gate of transistor $M_1$ to ground. This turns $M_1$ on which results in capacitor $C_t$ charging to the voltage $V_{SUP}$. When the MDI power is outside the power-on range, CMP1 floats its output and $R_5$ pulls the gate high turning off $M_1$.

At this point, $C_t$ discharges through R3. The time it takes $V_t$ to reach $V_R$ determines the memory time of the PD. When $V_t$ exceeds $V_R$, CMP2 asserts pd_remember. When $V_R$ exceeds $V_t$, the PD forgets it was turned on and pd_remember is deasserted. Both $V_R$ and $V_t$ are derived from $V_{SUP}$. Therefore, the memory time becomes independent of the $V_{SUP}$ voltage used.

CMP1 is powered from an MDI voltage and not the $V_{SUP}$ voltage so that the output of CMP1 becomes high impedance when the MDI is not in the power-on range. The current drawn by CMP1 and resistors $R_4$ and $R_6$ are selected so that the current they draw can be ignored or is taken into account by the PD circuits that provide the IEEE 802.3af requirements. CMP2 and other circuits required to track the state of pd_remember are powered off the charge stored on a capacitor or battery (not shown) that is isolated from $C_{SUP}$. This ensures that $V_{SUP}$ is closer to its initial value during the timed interval.

As shown in FIG. 6, the memory timer is coupled to other PD Circuits and further includes resistors $R_1$, $R_2$ and diodes $D_2$, $D_3$. It is to be understood that the circuit shown in FIG. 6 is only one example of a memory timer, and that other designs may be used without departing from the scope of the invention. The PD Circuits may include, for example, devices described below with respect to FIG. 8, or any other components required to meet IEEE 802.3af or other requirements.

In another embodiment, a more integrated timer replaces the resistors R5, R3, with current sources. The resistors R4 and R6 may be replaced by level shifters. Most of the components described above could be integrated on an integrated circuit.

The PD state diagram may also be implemented using a CPU (central processing unit). The CPU monitors a scaled MDI voltage by using a comparator, or logic input or analog to digital converter, as is well known by those skilled in the art. When the voltage is below normal operating levels the tpd_off_timer is started.

Figure 7:
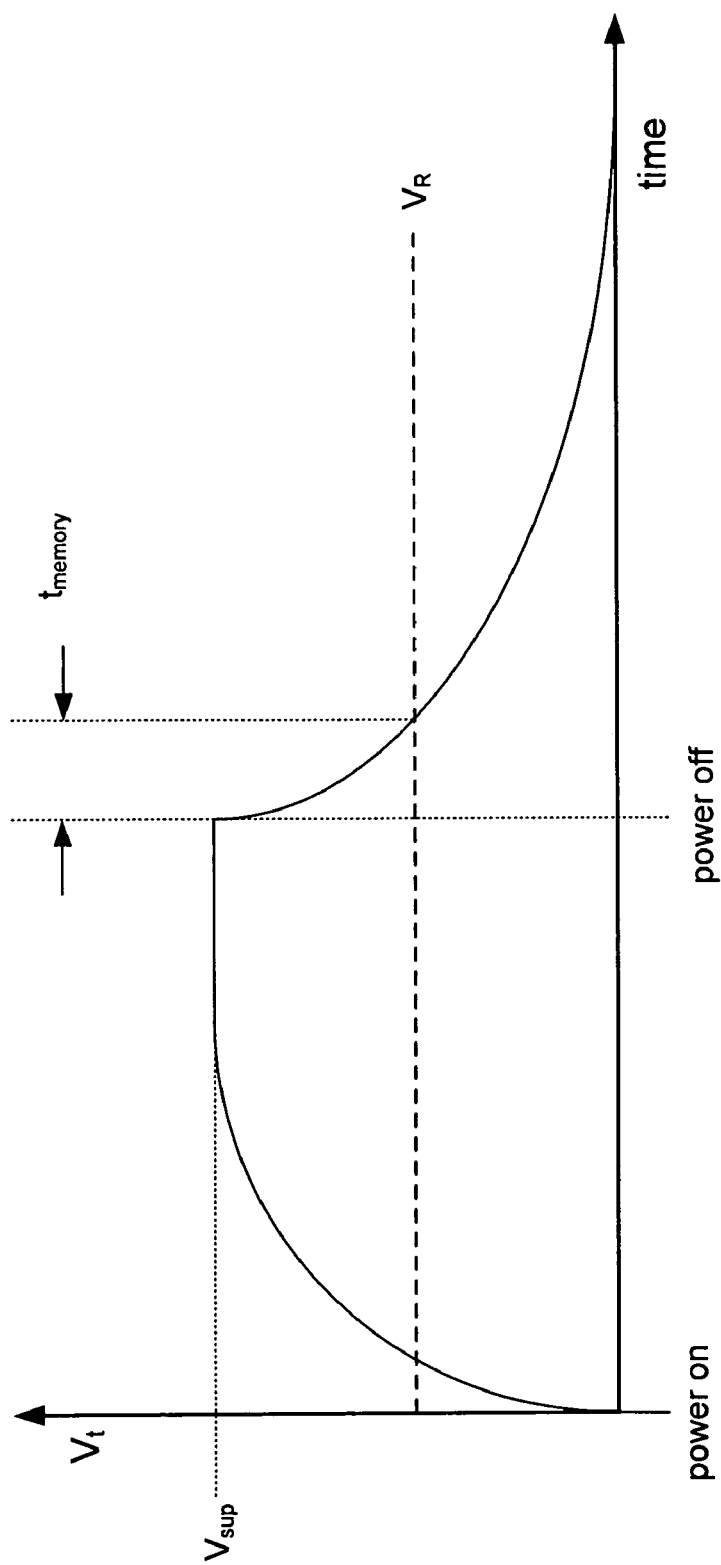
FIG. 7 is a chart of voltage versus time for the memory timer of FIG. 6.

FIG. 7 is a voltage versus time chart illustrating the PD memory timer shown in FIG. 6. In accordance with this embodiment, $V_t$ is the voltage of the storage capacitor and $V_{SUP}$ is the supply voltage. The voltage is turned on at time=power on. The voltage at the capacitor ramps up to the supply voltage and supply voltage is turned off at time=power off. The time period for the stored charge to drop to $V_R$ is the time period for the memory timer to complete its timing cycle ($t_{memory}$). In one embodiment of the invention, the length of the timing cycle is about 2 seconds. The drop off of $V_t$ after the supply voltage is turned off may be described as follows:

$$V_t(t) = V_{sup} e^{-t/\tau}$$

$$\tau = RC$$

(where t starts from 0 when at point "power off").

It is to be understood that the memory timer circuit shown in FIG. 6 and the voltage versus time graph shown in FIG. 7 is only one example and other designs and variables are possible and intended to be within the scope of the present invention. Also, the memory timer described above may be used in applications other than power over Ethernet, including any application in which a timer is needed to provide a window of time in which an electronic device remembers that it was previously powered on after power is removed.

FIG. 8 is a simplified block diagram illustrating a portion of the components of the powered device. The PD includes an identity network that can be presented to the PSE so that the PDs ability to utilize inline power can be confirmed during the detection process, as previously described. A current source provides fixed current values to the PSE for the classification process. The maximum power load is provided to present a power level to the PSE when the PD is in its maximum power mode. A controller may perform a number of functions. For example, the controller may cause a switch to close coupling the identify network to the network cable so that it may be detected by the PSE during the detection phase, or control the current source to provide a selected current value to the PSE. The controller may also select circuitry for drawing power in the maximum power mode, or select circuitry for operating the PD in a low power or high power mode. The PD further includes a memory timer described above with respect to FIG. 6 and may include additional components, as required, for example, to perform in accordance with IEEE 802.3af or 802.3at.

The PD may be powered over two pairs of a four-pair cable (as set forth in IEEE 802.3af) or may be powered by all four pairs of wire (as may be specified in IEEE 802.3 at). The PD may be configured to remember if it was powered using two pairs or four pairs. For example, the PD may use the memory circuit described above to remember that it was powered using two pairs. The PD may receive power over two pairs, recognize that it prefers power over four pairs, and disconnect itself. When the PD is rediscovered by the PSE, it remembers that it requested too low of a power level on the two pairs and requests a higher power level. The memory circuit described above may be used to remember that the PD was powered using two pairs. The memory function of the PD may also be used in combination with a CPU and other sensor input to make operational decisions.

As can be observed from the foregoing, the system and method described herein have many advantages. Powered devices are allowed to request the exact amount of power they require, beyond the conventional simple three tier classification. Therefore, power allocation is more precise allowing for more cost-effective deployments. Since the peak power demands are measured at the PSE, component variation and actual line losses can be accounted for. Also, variation in power requirements due to aging may be accounted for by turning off the powered device and remeasuring peak power demand. Furthermore, IEEE 802.3af backward compatible powered devices may use a low power mode to communicate with legacy power sourcing equipment. The method and system provide an infinite number of power levels without requiring levels to be transferred between the PSE and PD using extensions of existing methods.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method for requesting inline power at a powered device in a communications network, the method comprising:
   drawing power from power sourcing equipment over a wired communications network, the power corresponding to a requested power level at the powered device;
   operating the powered device in a first mode if said requested power level is maintained at the powered device; and
   operating the powered device in a second mode, if power from the power sourcing equipment to the powered device is removed and is restored within a predetermined time period.

2. The method of claim 1 wherein said first mode is a high power mode and said second mode is a low power mode.

3. The method of claim 2 wherein the powered device requires more than 12.95 watts in said high power mode.

4. The method of claim 1 wherein the powered device receives inline power corresponding to a power level class in said second mode.

5. The method of claim 1 further comprising, before drawing power corresponding to a requested power level:
  receiving a classification voltage at the powered device; and
  presenting a classification current at the powered device.

6. The method of claim 5 wherein said classification current is between 35 mA and 45 mA.

7. The method of claim 1 further comprising entering a maximum power mode at the powered device before drawing power corresponding to a requested power level.

8. The method of claim 7 wherein said requested power level generally corresponds to power required at the powered device when in said maximum power mode.

9. The method of claim 8 wherein said requested power level further comprises an additional power requirement corresponding to a safety margin for peak power demand at the powered device.

10. The method of claim 7 wherein said requested power level is a percentage of power required at the powered device when in said maximum power mode.

11. The method of claim 1 further comprising providing an indication at the powered device that the powered device is operating in said second mode.

12. The method of claim 1 further comprising repeating drawing power corresponding to a requested power level if power to the powered device is removed, and the power is not restored within said predetermined time.

13. The method of claim 1 further comprising starting a timer if power to the powered device is removed, wherein the timer measures said predetermined time period.

14. The method of claim 1 wherein power is restored to the powered device at a different power level than a level of the power removed from the powered device.

15. The method of claim 1 wherein operating the powered device in said second mode further comprises operating the powered device in said second mode only if the power to the powered device is removed within a second predetermined time period.

16. An apparatus for requesting inline power at a powered device in a communications network, the apparatus comprising:
  means for drawing power from sourcing equipment over a wired communications network, the power corresponding to a requested power level at the powered device;
  means for operating the powered device in a first mode if said requested power level is maintained at the powered device; and
  means for operating the powered device in a second mode, if power from the power sourcing equipment to the powered device is removed and is restored within a predetermined time period.

17. The apparatus of claim 16 further comprising means for entering a maximum power mode at the powered device before drawing power corresponding to a requested power level.

18. The apparatus of claim 16 further comprising a timer for measuring said predetermined time.

19. The apparatus of claim 18 wherein the timer is powered by a capacitor disposed at the powered device.

20. A powered device adapted to operate in conjunction with coupled power sourcing equipment so that it can receive inline power from the power sourcing equipment in a communications network, the powered device comprising a controller operable to present a requested power level at the powered device, select a first operating mode if said requested power level is maintained and select a second operating mode if power from the power sourcing equipment to the powered device is removed and is restored within a predetermined time period.

21. The powered device of claim 20 further comprising circuitry responsive to classification carried out by the power sourcing equipment, the circuitry presenting a responsive current to the power sourcing equipment, the current corresponding to a predetermined inline power class.

22. The powered device of claim 20 further comprising a memory circuit operable to temporarily store an indication that power was previously applied to the apparatus and a timer circuit operable to remove the indication from said memory circuit after said predetermined time period.

23. The powered device of claim 22 wherein the timer circuit is powered by a capacitor disposed in the powered device.

* * * * *